United States Patent
Yamamoto et al.

(10) Patent No.: US 7,404,097 B2
(45) Date of Patent: Jul. 22, 2008

(54) VEHICLE-INSTALLED MICROCOMPUTER SYSTEM THAT INTERRUPTS POWER TO HIGHER ACCURACY POWER SUPPLY CIRCUIT FOR SENSOR A/D CONVERTER IN SLEEP MODE

(75) Inventors: Naoki Yamamoto, Chita-gun (JP); Kazuo Nomoto, Toyokawa (JP); Tatsuya Suzuki, Kariya (JP)

(73) Assignee: Denso Corporation, Kariya (JP)

( * ) Notice: Subject to any disclaimer, the term of this patent is extended or adjusted under 35 U.S.C. 154(b) by 440 days.

(21) Appl. No.: 11/274,271

(22) Filed: Nov. 16, 2005

(65) Prior Publication Data

US 2006/0112290 A1 May 25, 2006

(30) Foreign Application Priority Data

Nov. 24, 2004 (JP) ............................. 2004-339452

(51) Int. Cl.
*G06F 1/32* (2006.01)
(52) U.S. Cl. ........................ 713/323; 701/36; 713/324
(58) Field of Classification Search .................. 701/36; 713/323, 324
See application file for complete search history.

(56) References Cited

U.S. PATENT DOCUMENTS 6,642,879 B2 * 11/2003 Amar et al. .................. 341/155
7,276,887 B2 * 10/2007 Miki et al. .................. 323/269
2007/0018711 A1 * 1/2007 Miki et al. .................. 327/407

FOREIGN PATENT DOCUMENTS

JP    A 2004-280763    10/2004

* cited by examiner

*Primary Examiner*—Chun Cao
*Assistant Examiner*—Albert Wang
(74) *Attorney, Agent, or Firm*—Oliff & Berridge, PLC

(57) ABSTRACT

The vehicle-installed microcomputer system includes an A/D converter converting analog signal sent from an onboard sensor circuit into digital signal, a microcomputer which operates in one of regular mode where a predetermined arithmetic computation on the digital signal is performed, and sleep mode where the predetermined arithmetic computation is prohibited from being performed, a first power supply circuit supplied with electric power from outside to produce a power supply voltage to be applied to the microcomputer, a second power supply circuit supplied with electric power from outside through an interruption switch to produce a power supply voltage to be applied to the A/D converter and the sensor circuit, the second power supply circuit having an output voltage accuracy higher than that of the first power supply circuit. The power interruption switch is opened to prohibit the second power supply circuit from being supplied with electric power in the sleep mode.

9 Claims, 7 Drawing Sheets

VEHICLE-INSTALLED MICROCOMPUTER SYSTEM THAT INTERRUPTS POWER TO HIGHER ACCURACY POWER SUPPLY CIRCUIT FOR SENSOR A/D CONVERTER IN SLEEP MODE

CROSS-REFERENCE TO RELATED APPLICATION

This application is related to Japanese Patent Application No. 2004-339452 filed on Nov. 24, 2004, the contents of which are hereby incorporated by reference.

BACKGROUND OF THE INVENTION

1. Field of the Invention

The present invention relates to a vehicle-installed microcomputer system having a function of processing sensor signals received from onboard sensors.

2. Description of Related Art

In recent vehicles, most of onboard devices are controlled by a microcomputer-based control system configured to convert analog sensor signals received from various sensors into digital signals, and compute the digital signals for the purpose of making necessary indication or alarm, or controlling external devices. Since the recent vehicles are provided with many sensors, such a microcomputer-based control system has many A/D converters for converting analog signals into digital signals.

The microcomputer-based control system including the A/D converters and the onboard sensors are supplied with electric power from a vehicle battery through a constant-voltage power supply circuit, as shown, for example, in Japanese Patent Application Laid-open No. 2004-280763, because the variation in the terminal voltage of the vehicle battery is relatively large.

The microcomputer-based control system is required to operate for a specific purpose such as security maintaining operation even after an ignition key is turned off to stop a vehicle engine. Meanwhile, there is a strong demand to reduce electric power consumption of the microcomputer-based control system in view of a limited capacity of the vehicle battery. Accordingly, it is common that the microcomputer is configured to enter a sleep mode where it operates on small electric power when the ignition key is turned off.

In the sleep mode, the microcomputer cannot perform most arithmetic computations other than simple operations (reception of a timer signal or an awake signal, for example), because its clock frequency is set at a low value while the microcomputer is in the sleep mode. It is also known that the microcomputer temporarily changes from the sleep mode to an awake mode for performing essential operations each time the microcomputer has received the awake signal, or each time a certain time has elapsed after the microcomputer has last entered the sleep mode.

FIG. 7 shows a configuration of a conventional vehicle-installed microcomputer system including A/D converters 105 to 108, a CPU 109, an I/O (input/output) interface circuit 110, a backflow preventing diode 120 connected to a vehicle battery, and a constant-voltage power supply circuit 111. The reference numerals 101 to 104 denote sensor circuits outputting analog sensor signal to the A/D converters 105 to 108.

At least a part of this vehicle-installed microcomputer system may be implemented as a single chip processor as shown in FIG. 8. The single chip processor shown in this figure includes the A/D converters 105, 106, CPU 109, I/O interface circuit 110, backflow preventing diode 120, constant-voltage power supply circuit 111, and a voltage detector detecting a terminal voltage of a vehicle battery as the sensor circuit 101.

The number of the onboard sensors connected to the vehicle-installed microcomputer system is increasing more and more in recent years. Under such circumstances, there arises a problem in that the power consumption of the vehicle-installed microcomputer systems is not reduced much even when it enters the sleep mode. This is caused by the fact that the power consumption of the constant-voltage power supply circuit of the recent vehicle-installed microcomputer systems, which is mainly due to resistance loss therein, is large, because the constant-voltage circuit of the recent vehicle-installed microcomputer systems has such a large power supply capacity as is needed to be able to supply electric power to many onboard sensors. The large power consumption of the vehicle-installed microcomputer system while the vehicle engine is stopped causes the vehicle battery to become exhausted too soon.

The power consumption of the constant-voltage power supply circuit also depends on its output accuracy. A high-accuracy constant-voltage power supply circuit generally used for supplying power to high-precision analog sensor circuits consumes a very large amount of electric power compared to a moderate-accuracy constant-voltage power supply circuit generally used for supplying power to digital circuits. Accordingly, the burden on the vehicle battery while the vehicle engine is stopped can be eased greatly, if a moderate-accuracy constant-voltage power supply circuit is used instead of the high-accuracy constant-voltage power supply circuit for the vehicle-installed microcomputer system.

However, it is desirable to use the high-accuracy constant-voltage power supply circuit in terms of avoiding the control accuracy of the vehicle-installed microcomputer system from being lowered.

SUMMARY OF THE INVENTION

The invention provides a vehicle-installed microcomputer system including:

an A/D converter converting an analog signal sent from an external sensor circuit into a digital signal;

a microcomputer which operates in one of a regular mode where a predetermined arithmetic computation on the digital signal is performed, and a sleep mode where the predetermined arithmetic computation is prohibited from being performed;

a first power supply circuit supplied with electric power from outside to produce a first power supply voltage to be applied to the microcomputer; and a second power supply circuit supplied with electric power from outside through an interruption switch to produce a second power supply voltage to be applied to the A/D converter and the external sensor circuit, the second power supply circuit having an output voltage accuracy higher than that of the first power supply circuit;

wherein the microcomputer is configured to close the power interruption switch to allow the second power supply circuit to be supplied with electric power in the regular mode, and to open the power interruption switch to prohibit the second power supply circuit from being supplied with electric power in the sleep mode.

With the present invention, it is possible to satisfy the reduction of power consumption and the high control accuracy in the vehicle-installed microcomputer system, because the high-accuracy power supply circuit is not supplied with electric power in the sleep mode, and accordingly, the electric power consumed by the high-accuracy power supply circuit and the sensor circuits can be saved in the sleep mode.

PREFERRED EMBODIMENTS OF THE INVENTION

Figure 1:
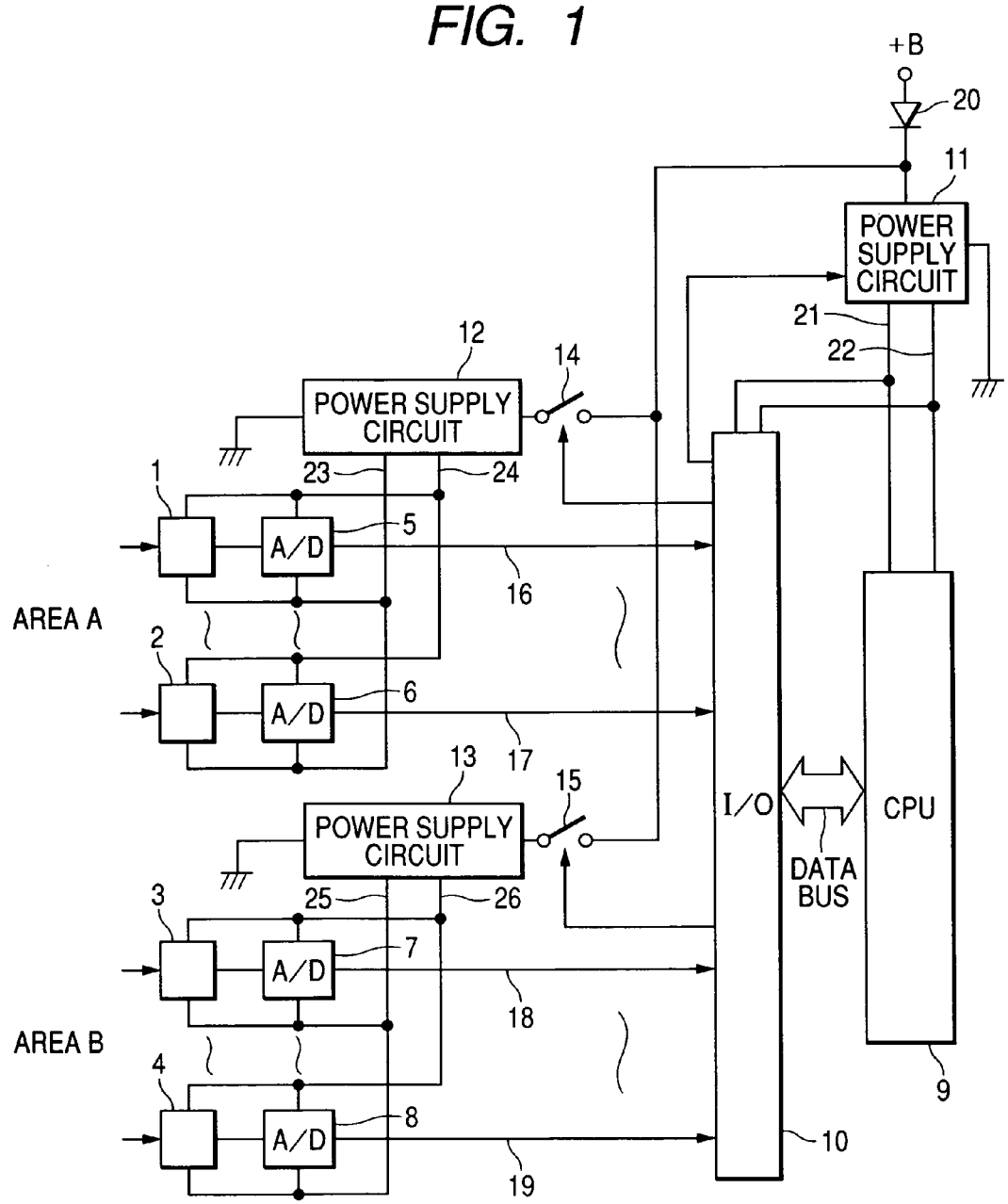
FIG. 1 is a block diagram showing a configuration of a vehicle-installed microcomputer system according to an embodiment of the invention.

FIG. 1 is a block diagram showing a configuration of a vehicle-installed microcomputer system according to an embodiment of the invention.

The vehicle-installed microcomputer system includes a CPU 9, an I/O interface circuit 10, A/D converters 5 to 8 connected to the I/O interface circuit 10 through signal wires 16 to 19, a constant-voltage power supply circuit 11 for a microcomputer, constant-voltage power supply circuits 12, 13 for the A/D converters 5 to 8 and sensor circuit 1 to 4, power interruption switches 14, 15, and a backflow preventing diode 20 connected to a high-voltage vehicle battery (not shown). The CPU 9 and the I/O interface circuit 10 connected to the CPU 9 through a bus constitute the microcomputer together with memories (not shown).

The sensor circuits 1, 2 and the A/D converters 5, 6 are located in an area A near the high-voltage vehicle battery. The I/O interface circuit 10 receives, through the A/D converters 5, 6 and other not shown A/D converters, digital signals representing the state of the vehicle battery including the temperature, load current, and terminal voltage of the vehicle battery detected by the sensor circuits 1, 2 and other not shown sensor circuits. The A/D converters 5, 6 may be replaced by a single common A/D converter operating on a time divisional basis for the purpose of reducing the circuit scale of the system. In this case, the signal wires 16, 17 are replaced by a serial data bus.

The sensor circuits 3, 4 and the A/D converters 7, 8 are located in an area B near a vehicle engine. The I/O interface circuit 10 receives, through the A/D converters 7, 8 and other not shown A/D converters, digital signals representing the state of the vehicle engine detected by the sensor circuits 3, 4 and other not shown sensor circuits. The A/D converters 7, 8 may be replaced by a single common A/D converter operating on a time divisional basis for the purpose of reducing the circuit scale of the system. In this case, the signal wires 18, 19 are replaced by a serial data bus.

The CPU 9 periodically loads the digital signals outputted from the A/D converters 5 to 8 through the I/O interface circuit 10 to check the states of the vehicle battery and vehicle engine for the control of the vehicle engine.

The constant-voltage power supply circuit 11 produces a 5-volt power supply voltage for the microcomputer from the battery voltage supplied from the vehicle battery through the backflow preventing diode 20, supplies it to each part of the microcomputer including the I/O interface circuit 10 and CPU 9 through feeding wires 21, 22.

The constant-voltage power supply circuit 12 produces, from the battery voltage supplied from the vehicle battery through the backflow preventing diode 20 and the power interruption switch 14, a 3-volt or 5-volt power supply voltage, and supplies it to the sensor circuits 1, 2 and A/D converters 5, 6 through feeding wires 23, 24.

The constant-voltage power supply circuit 13 produces, from the battery voltage supplied from the vehicle battery through the backflow preventing diode 20 and the power interruption switch 15, a 3-volt or 5-volt power supply voltage, and supplies it to the sensor circuits 3, 4 and A/D converters 7, 8 through feeding wires 25, 26.

The power supply circuits 12, 13 are far superior in accuracy to the power supply circuit 11. The output voltage variation of the power supply circuits 12, 13 is as small as one tenth that of the power supply circuit 11. That is because the sensor circuits 1 to 4 and A/D converters 5 to 8 are circuits processing analog signals, and accordingly need a power supply voltage much more accurate than that which the microcomputer processing the digital signals needs. In this embodiment, the output voltage variation of the power supply circuit 11 is in the range between −5% and +5%, while that of the power supply circuits 12, 13 is in the range between −0.5% and +0.5%.

Next, the operation of the vehicle-installed microcomputer system having the above described configuration is explained below.

The CPU 9 operates in a mode selected from a regular mode, a sleep mode, and an awake mode. The CPU 9 selects the regular mode when an ignition switch (not shown) is judged to be in the on state on the basis of input information representing the state of the ignition switch, while it selects sleep mode when the ignition switch is judged to be in the off state.

Figure 2:
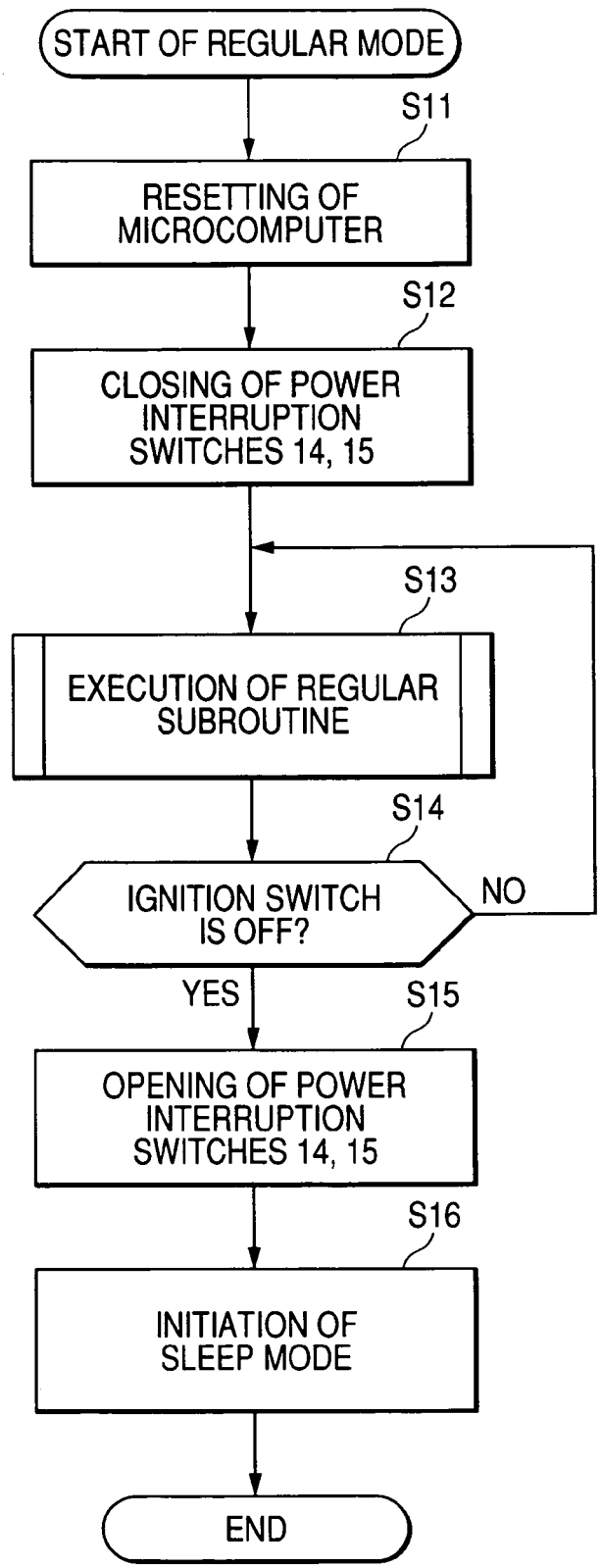
FIG. 2 is a flowchart showing operation of the vehicle-installed microcomputer system in a regular mode.

First, explanation is made as to the regular mode with reference to the flowchart of FIG. 2. The regular mode is initiated, when the ignition switch is turned on as a result of which the battery voltage is applied to the power supply circuit 11 so that the microcomputer becomes operative.

When the regular mode begins, the microcomputer is reset at step S11, and at the subsequent step S12, the power interruption switches 14, 15 are closed in order to supply the accurate power supply voltage produced by the power supply circuits 12, 13 to the sensor circuits 1 to 4 and the A/D converters 5 to 8. In consequence, a regular subroutine is executed at step S13. In this regular subroutine, the A/D converters 5 to 8 convert the analog sensor signals received from the sensor circuits 1 to 4 into digital signals formed by a certain number of bits, and output them to the I/O interface circuit 10 so that they are processed by the CPU 9. Each time one cycle of the regular subroutine terminates, it is checked at step S14 whether or not the ignition switch is tuned off. If it is determined that the ignition switch is not turned off, the operation process returns to step 13 to perform another cycle of the regular subroutine. On the other hand, if it is determined that the ignition switch is turned off, the power interruption switches 14, 15 are opened (disconnected), and initiates the sleep mode at step S16 before the operation process of the regular mode terminates. By opening the power interruption switches 14, 15, not only the electric power consumed by the sensor circuits 1 to 4 and the A/D converters 5 to 8, but also the large electric power consumed by the power supply circuits 12, 13 can be saved.

Figure 3:
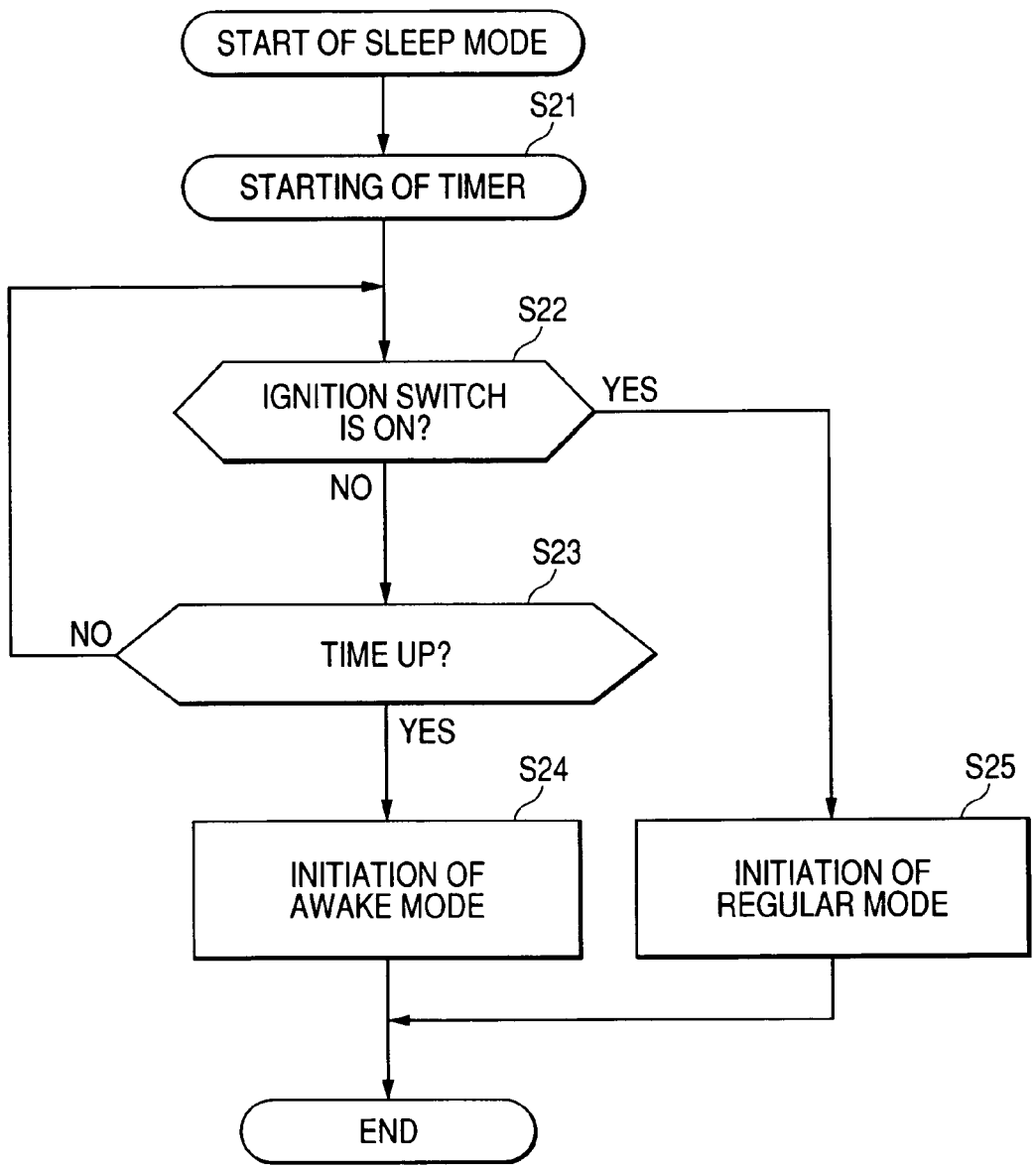
FIG. 3 is a flowchart showing operation of the vehicle-installed microcomputer system in a sleep mode.

Next, explanation is made as to the sleep mode with reference to the flowchart of FIG. 3. When the sleep mode begins, a built-in timer (time measuring program) is activated at step S21, and at the subsequent step S22, it is checked whether or not the ignition switch is turned on. If it is determined that the ignition switch is turned on, then the regular mode is initiated again at step S25 before the process of the sleep mode terminates. If it is determined that the ignition switch is not turned on, it is checked at step S23 whether or not the timer has timed up. If it is determined the timer has timed up, the awake mode is initiated at step S24 before the process of the sleep mode terminates. If it is determined the timer has not timed up yet, the operation process returns to step S22.

Figure 4:
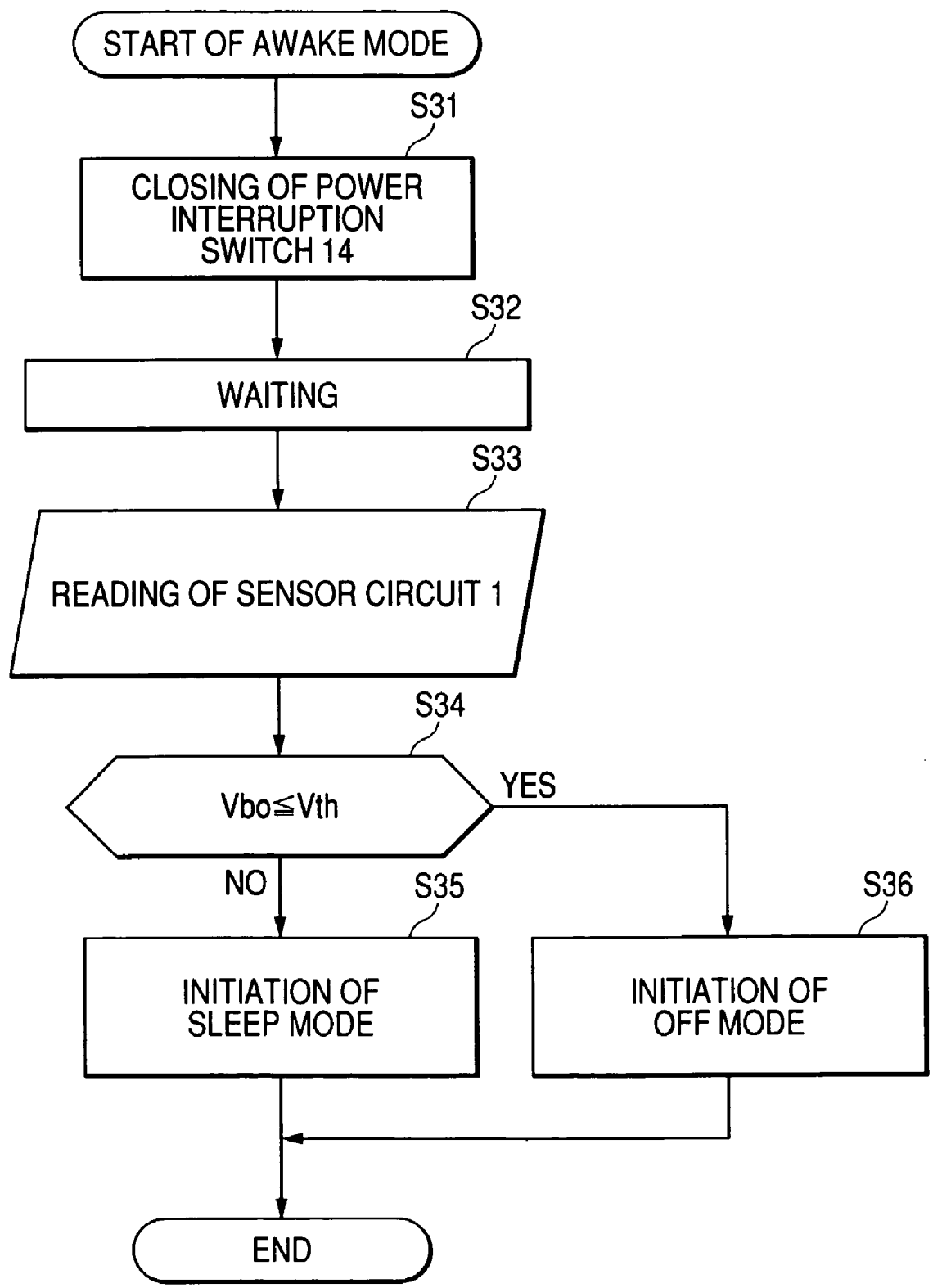
FIG. 4 is a flowchart showing operation of the vehicle-installed microcomputer system in an awake mode.

Next, explanation is made as to the awake mode with reference to the flowchart of FIG. 4. When the awake mode begins, of the two power interruption switches 14, 15, only the power interruption switch 14 is closed in order to detect the state of the vehicle battery. After that, the operation process waits at step S32 until a predetermined time elapses.

When the predetermined time has elapsed, the sensor signal originating from the sensor circuit 1 is read at step S33 to check whether or not the battery voltage Vbo of the vehicle battery is smaller than a predetermined threshold voltage Vth at step S34. If it is determined that the battery voltage Vbo is equal to or smaller than the threshold voltage Vth, an off mode is initiated at step S36 to avoid the vehicle battery from being overdischarged before the process of the awake mode terminates. On the other hand, if it is determined that the battery voltage Vbo is larger than the threshold voltage Vth, the sleep mode is initiated at step S35 before the process of the awake mode terminates. Once the microcomputer system enters this off mode, electric power is not supplied to any element of the microcomputer system except the power supply circuit 11 until the ignition switch is turned on to thereby start the regular mode.

As explained above, in the awake mode, of the two power supply circuits 12, 13, only the power supply circuit 12 supplying electric power to the sensor circuit 1 outputting the sensor signal necessary for checking the battery voltage is closed, to thereby avoid the power supply circuit 13 from consuming electric power uselessly.

The microcomputer system may be so configured that the power interruption switch 14 is kept opened after the A/D converters 5, 6 sample the analog signals outputted from the sensor circuits 1, 2 until the A/D converters 5, 6 next sample the analog signals, if the sampling interval of the A/D converters 5, 6 is sufficiently long. This configuration makes it possible to further reduce the power consumption of the system.

The power supply circuit 11 may be so configured as to be turned on in synchronization with the ignition switch. It is known that the microcomputer can operate on a low power supply voltage when its clock frequency is lowered. Accordingly, the power supply voltage produced by the power supply circuit may be lowered from 5V to an appropriate voltage in the sleep mode.

Figure 5:
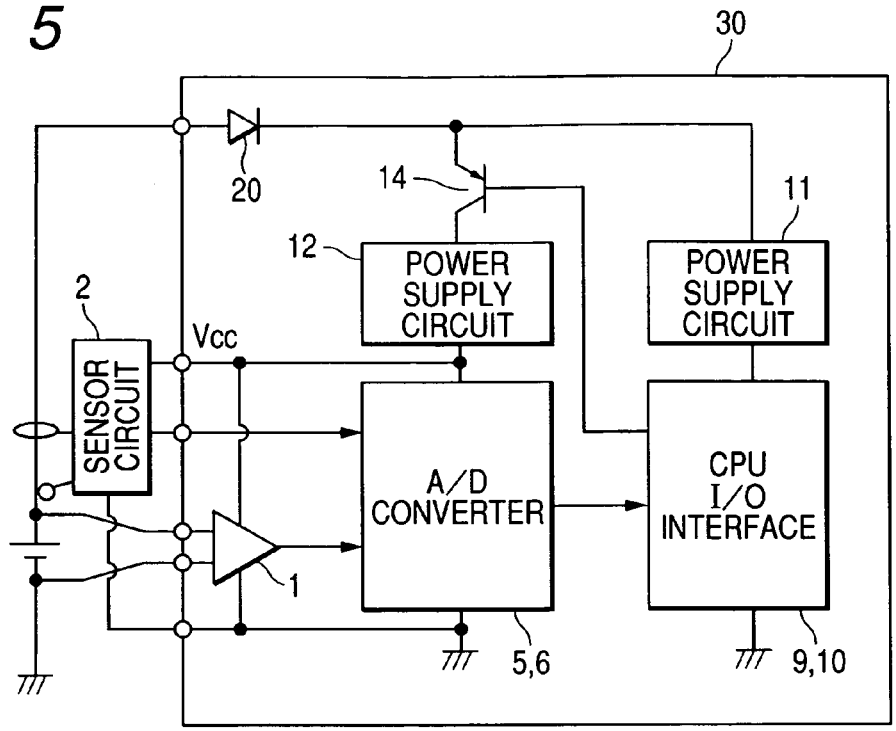
FIG. 5 is a block diagram showing a configuration of the vehicle-installed microcomputer system implemented in a single chip processor.

At least a part of the above described vehicle-installed microcomputer system may be implemented as a single chip processor to obtain further reduction of power consumption. FIG. 5 shows a case where the CPU 9, I/O interface circuit 10, A/D converters 5, 6, backflow preventing diode 20, power supply circuits 11, 12, power interruption switch 14, and sensor circuit 1 are formed in a single chip using the BiCMOS technology.

Figure 6:
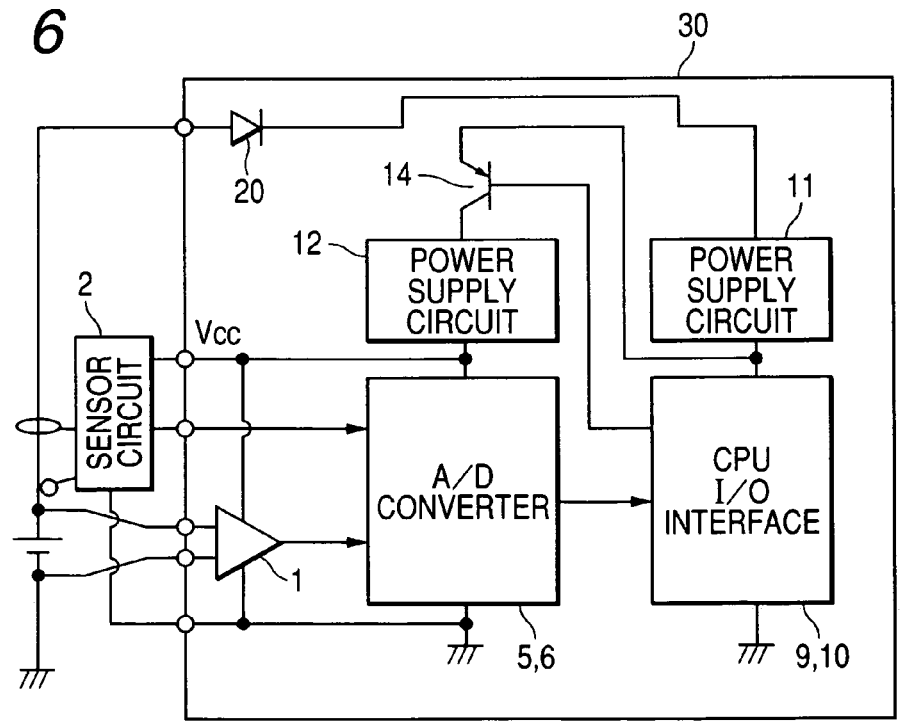
FIG. 6 is a block diagram showing a variant of the configuration of the vehicle-installed microcomputer system implemented in a single chip processor.
Figure 7:
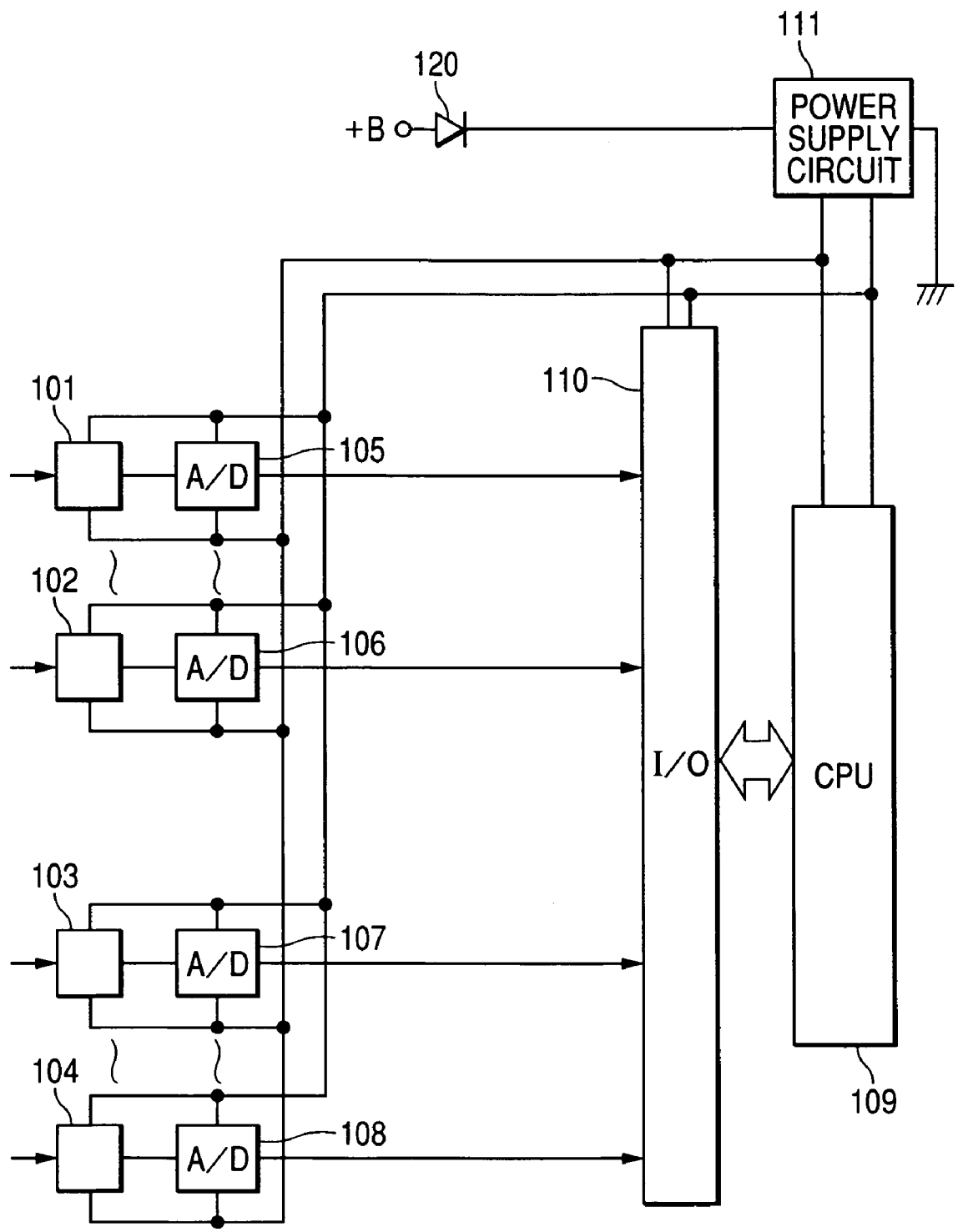
FIG. 7 is a block diagram showing a configuration of a conventional vehicle-installed microcomputer system.
Figure 8:
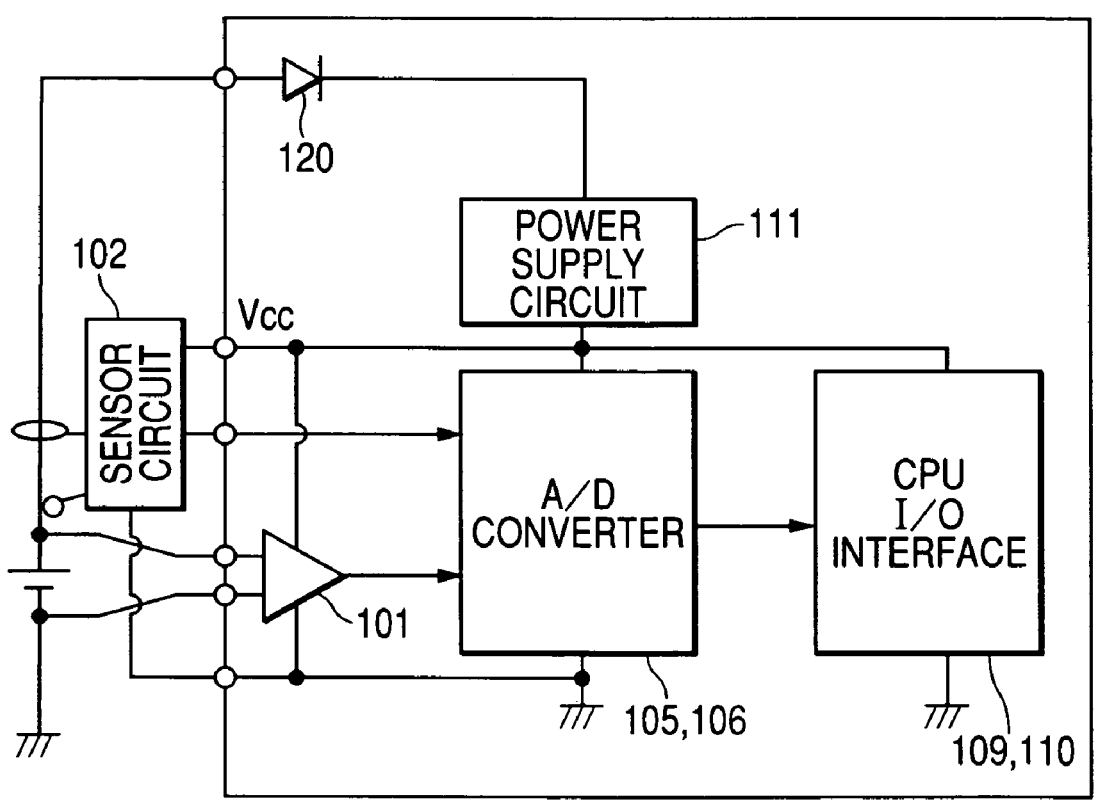
FIG. 8 is a block diagram showing a configuration of the conventional vehicle-installed microcomputer system implemented in a single chip processor.

In the configuration of FIG. 5, the power interruption switch 14 may be disposed to receive the output voltage of the power supply circuit 11 at its input as shown in FIG. 6. With this configuration, it becomes possible to supply the A/D converters and sensor circuits with a sufficiently stabilized power supply voltage when a not so accurate power supply circuit is used as the power supply circuit 12.

Although the vehicle-installed microcomputer system operates in one of the regular mode, sleep mode, and awake mode, it may be so modified as to operate in either one of the regular mode and the sleep mode.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-installed microcomputer system comprising:
    an A/D converter converting an analog signal sent from an external sensor circuit into a digital signal;
    a microcomputer which operates in one of a regular mode where a predetermined arithmetic computation on said digital signal is performed, and a sleep mode where said predetermined arithmetic computation is prohibited from being performed;
    a first power supply circuit supplied with electric power from outside to produce a first power supply voltage to be applied to said microcomputer; and
    a second power supply circuit supplied with electric power from outside through a power interruption switch to produce a second power supply voltage to be applied to said A/D converter and said external sensor circuit, said second power supply circuit having an output voltage accuracy higher than that of said first power supply circuit;
    wherein said microcomputer is configured to close said power interruption switch to allow said second power supply circuit to be supplied with electric power in said regular mode, and to open said power interruption switch to prohibit said second power supply circuit from being supplied with electric power in said sleep mode.

2. The vehicle-installed microcomputer system according to claim 1, wherein said microcomputer is configured to select said regular mode when an ignition switch of a vehicle engine is turned on, and to select said sleep mode when said ignition switch is turned off.

3. The vehicle-installed microcomputer system according to claim 1, wherein said first and second power supply circuits are supplied with electric power from a vehicle battery.

4. The vehicle-installed microcomputer system according to claim 1, wherein said first power supply circuit is supplied with electric power from a vehicle battery, and said second power supply circuit is supplied with electric power from said first power supply circuit through said power interruption switch.

5. The vehicle-installed microcomputer system according to claim 1, wherein at least a part of said vehicle-installed microcomputer system is implemented in a single chip processor.

6. A vehicle-installed microcomputer system comprising:
    a first A/D converter converting an analog signal sent from a first external sensor circuit into a first digital signal;

a second A/D converter converting an analog signal sent from a second external sensor circuit into a second digital signal;

a microcomputer which operates in one of a regular mode where a first arithmetic computation on said first digital signal is performed and a second arithmetic computation on said second digital signal is performed, a sleep mode where said first and second arithmetic computations are prohibited from being performed, and an awake mode where said first arithmetic computation is performed and said second arithmetic computation is prohibited from being performed;

a first power supply circuit supplied with electric power from outside to produce a first power supply voltage to be applied to said microcomputer;

a second power supply circuit supplied with electric power from outside through a first power interruption switch to produce a second power supply voltage to be applied to said first A/D converter and said first external sensor circuit;

a third power supply circuit supplied with electric power from outside through a second power interruption switch to produce a third power supply voltage to be applied to said second A/D converter and said second external sensor circuit;

said second and third power supply circuits having an output voltage accuracy higher than that of said first power supply circuit;

wherein said microcomputer is configured to close said first and second power interruption switches to allow said second and third power supply circuit to be supplied with electric power in said regular mode, to open said first and second power interruption switches to prohibit said second and third power supply circuits from being supplied with electric power in said sleep mode, and to close said first power interruption switch and open said second power interruption switch to allow said second power supply circuit to be supplied with electric power and to prohibit said third power supply circuit from being supplied with electric power in said awake mode.

7. The vehicle-installed microcomputer system according to claim 6, wherein said microcomputer is configured to select said regular mode when an ignition switch of a vehicle engine is turned on, to select said sleep mode when said ignition switch is turned off, and to select said awake mode each time a predetermined time elapses after said microcomputer last selects said sleep mode, said microcomputer being configured to select said sleep mode also after said first arithmetic computation is performed in said awake mode.

8. The vehicle-installed microcomputer system according to claim 7, wherein said first, second and second power supply circuits are supplied with electric power from a vehicle battery.

9. The vehicle-installed microcomputer system according to claim 8, wherein said first arithmetic computation includes detecting whether or not a terminal voltage of said vehicle battery is larger than a predetermined threshold voltage.

* * * * *